United States Patent [19]

Conant et al.

[11] 4,239,111
[45] Dec. 16, 1980

[54] FLEXIBLE POUCH WITH CROSS-ORIENTED PUNCTURE GUARD

[75] Inventors: Roger P. Conant, Glencoe; Raymond G. Duffy, Du Page County, both of Ill.

[73] Assignee: Laminating & Coating Corporation, Schaumburg, Ill.

[21] Appl. No.: 40,584

[22] Filed: May 21, 1979

[51] Int. Cl.³ .................. B65D 25/36; B65D 81/20; B65D 85/00
[52] U.S. Cl. .................. 206/484; 206/45.33; 206/525; 229/3.5 R; 229/55; 426/124
[58] Field of Search .................. 206/484, 525; 229/3.5 R, 55; 426/124, 127, 129, 415; 428/215

[56] References Cited

U.S. PATENT DOCUMENTS

| | | | |
|---|---|---|---|
| 2,891,870 | 6/1959 | Selby et al. | 426/127 |
| 3,264,165 | 8/1966 | Stickel | 206/3.5 R |
| 3,342,613 | 9/1967 | Schelhorn | 426/127 |
| 3,494,457 | 2/1970 | Titchenal | 229/55 |
| 3,559,800 | 2/1971 | Butler et al. | 206/629 |
| 3,625,348 | 12/1971 | Titchenal | 426/415 |
| 3,669,256 | 6/1972 | Jacob | 206/484 |
| 3,741,253 | 6/1973 | Brax et al. | 426/127 |
| 3,932,693 | 1/1976 | Shaw et al. | 426/129 |
| 3,948,436 | 4/1976 | Bambara | 229/55 |
| 3,949,135 | 4/1976 | Vercauteren | 428/215 |
| 4,101,711 | 7/1978 | Stillman | 229/55 |
| 4,136,205 | 1/1979 | Quattlebaum | 229/55 |

*Primary Examiner*—William T. Dixson, Jr.
*Attorney, Agent, or Firm*—Wegner, Stellman, McCord, Wiles & Wood

[57] ABSTRACT

A flexible pouch for packing under vacuum products having sharp projections, such as projecting bones of meat products. The pouch includes a flexible bag formed of heat sealable, puncture-susceptible sheet material and having a puncture guard element secured to the outer surface of the bag. The puncture guard causes the flexible pouch to be highly resistant to puncture by sharp projections such as sharp bones of meat products. The puncture guard preferably includes a plurality of oriented sheets which are laminated in cross-oriented relationship to each other. The puncture guard preferably has an area less than that of the bag. The bag may be a laminate. The puncture guard sheets may have equal thickness and may be secured to each other as by extrusion bonding. In the illustrated embodiment, the bag and the puncture guard are laminates.

13 Claims, 3 Drawing Figures

FLEXIBLE POUCH WITH CROSS-ORIENTED PUNCTURE GUARD

BACKGROUND OF THE INVENTION

1. Field of the Invention

This invention relates to vacuum-sealed packaging of objects in flexible bags and in particular to packaging for use with objects, such as meat products, having sharp projections.

2. Description of the Prior Art

It is conventional in packaging meat products and the like to place the meat product in a bag formed of a suitable heat sealable material and causing the bag to be drawn about the meat product under vacuum so as to vacuum seal the meat product in the bag thereby to effectively package the meat product for long shelf life.

It has been found, however, that at times relatively sharp projections, such as bone projections of the meat products, may puncture the bag material, thereby causing loss of vacuum and resultingly undesirable degradation of the packaged meat product.

One attempted solution to this problem has been the provision of a bone guard conventionally comprising a sheet of suitable waxed cloth or other tear-resistant material which is placed by hand in overlying relationship to the meat product sharp projections. The sheet must be maintained in the desired position relative to the meat product while the meat product is inserted into the flexible bag.

This method of preventing perforation of the pouch has the serious disadvantage of relatively high cost and low product rate. Further, at times, the bone guard slips from the desired position during the insertion of the meat into the bag, thereby rendering the bag effectively unprotected.

The background art includes a number of pertinent U.S. Letters Patent. Illustratively, U.S. Letters Patent 2,891,870 of Meyer S. Selby et al, shows a method of packaging utilizing the conventional internal bone guard member presenting the problem discussed above.

Carl A. Stickel shows, in U.S. Pat. No. 3,264,165, an insulating bag formed of a large number of different layers including vinyl chloride, polyurethane and polyethylene materials. Stickel teaches the use of foam for protecting the resin films from being punctured.

Frederick B. Schelhorn shows, in U.S. Pat. No. 3,342,613, a laminated blanket including a moisture-absorbent layer and a polyethylene or polyvinyl chloride layer.

O. R. Titchenal shows an abuse resistant bag in U.S. Pat. No. 3,494,457 wherein an outer envelope is fitted loosely over an inner envelope to protect the inner envelope from punishment.

In U.S. Pat. No. 3,559,800, John Parkman Butler et al show a multiply pouch formed of heat sealable materials. Butler et al teach the formation of pouches of polyethylene, polypropylene and vinyl chloride.

O. R. Titchenal et al show, in U.S. Pat. No. 3,625,348, a packaged article wherein the outer covering comprises a multilayer flexible plastic sheet including a self-adhering plastic inner layer facing the packaged article. Titchenal et al disclose a wide range of materials for use in the different layer.

Ezekiel J. Jacob, in U.S. Pat. No. 3,669,256, shows a surgical blade package wherein a multilayer bag is formed of a wide range of materials.

Harri J. Brax et al show a multiply laminate for use as a packaging film in U.S. Pat. No. 3,741,253 wherein the different layers are formed of different disclosed materials. This patent is concerned with the problem of packaging bone-in cuts of meat and relies on the use of a specific inside coating of the plastic film to provide a good barrier layer.

Fred B. Shaw et al, in U.S. Pat. No. 3,932,693, show a laminated packaging film formed of a number of different synthetic resins.

Josef Vercauteren shows a packaging film formed of a number of different synthetic resins in U.S. Pat. No. 3,949,135 and teaches that the bag be abrasion, puncture and tear resistant. Vercauteren discloses a wide range of materials from which his film may be formed.

SUMMARY OF THE INVENTION

The present invention comprehends an improved flexible pouch having an outer puncture guard effectively integrated with the flexible bag. Thus, while the flexible bag may be formed of a conventional relatively thin, readily heat sealable sheet material, the puncture guard causes the pouch to be also highly puncture-resistant.

More specifically, in the disclosed invention, the flexible bag is provided with an outer puncture guard formed of a cross-oriented laminate of synthetic resin layers. The puncture guard may have a thickness greater than the thickness of the flexible bag material. In the disclosed embodiment, the guard has a thickness of approximately one and one-half times the thickness of the bag material.

The outer layer may extend less than the total outer area of the pouch and is preferably spaced from the open end of the pouch to permit facilitated heat sealing thereof.

The flexible bag may be formed as a laminate of a plurality of different synthetic resin materials. In the illustrated embodiment, the outer surface of the flexible enclosure is formed of nylon.

In the illustrated embodiment, the puncture guard comprises a multilayer sheet material.

In the illustrated embodiment, the guard comprises a laminate of grain-oriented sheets each having a thickness of approximately 2.5 to 3 mils, the sheets being cross-oriented to each other at an angle such as 90°.

Illustratively, the guard sheets may be formed of crystalline synthetic resin materials which may be stretch oriented and facially bonded together at the desired cross-orientation angle.

The sheets may be bonded by an extrusion bond wherein a hot synthetic resin melt is provided therebetween.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 2:
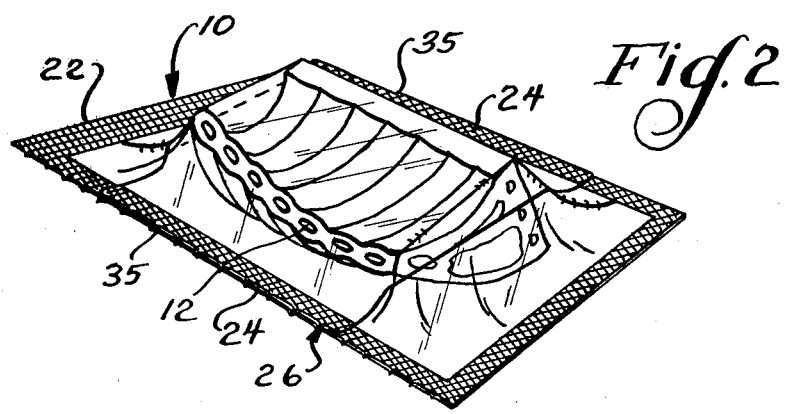
FIG. 2 is a perspective view of a meat product packaged in the flexible pouch embodying the invention.

In the exemplary embodiment of the invention as disclosed in the drawing, a flexible pouch generally designated 10 is provided for packaging under vacuum an object such as a meat product 11, having one or more sharp projections which may perforate the pouch during handling thereof. In the illustrated embodiment the product is a meat product having bone projections 12 such as illustrated in FIG. 2. The present invention is concerned with the prevention of puncture of pouch 10 as by the projections 12 during handling of the packaged meat product, such as in distribution and marketing thereof.

More specifically, pouch 10 is caused to be drawn about the product 11 by the application of a vacuum within the pouch after the product is inserted therein. The facially engaging portions at the open end 34 of the pouch, such as portion 14, are then heat sealed so as to provide a positively sealed, vacuum packaged enclosure of the meat product which, by excluding air from access to the meat product, provides an improved long shelf life of the packaged product.

As briefly indicated above, the present invention comprehends the provision of an outer puncture guard for causing the flexible pouch to be highly puncture-resistant. The invention comprehends that the flexible pouch be formed by a flexible enclosure, or bag, 15 having a portion thereof provided with an outer guard patch 16. Patch 16 is facially carried on the outer surface 17 of the flexible bag and effectively causes the pouch to be effectively puncture-resistant notwithstanding the formation of bag 15 thereof of puncture-susceptible material.

In the illustrated embodiment, flexible enclosure 15 is formed of a laminate having a total thickness of approximately 3¾ mils. Illustratively, enclosure 15 may innclude an outer layer 18 formed of a suitable synthetic resin, illustratively such as a polyamide, having a thickness of approximately 1 to 1.25 mils, and intermediate layer 19 formed of a suitable synthetic resin, illustratively such as a low density polyethylene copolymer having a low percentage of vinyl acetate such as in the range of approximately 3 to 6%, and having a thickness of approximately 1½ mils and an inner sealant layer 20 formed of a suitable synthetic resin, illustratively such as polyethylene copolymer having approximately 18% vinyl acetate and having a thickness of approximately 1 mil. Alternatively the inner layer 20 may comprise a Surlyn ionomer resin such as manufactured by E. I. DuPont DeNemours. Layer 20 may comprise an extrusion coating layer. The layers of the laminate may be bonded together by suitable conventional means. In the illustrated embodiment, outer layer 18 is bonded to intermediate layer 19 by an adhesive 21. Inner layer 20 illustratively may be extrusion-bonded to intermediate layer 19. The outer layer 18 may advantageously be formed of coated nylon 6.

Figure 3:
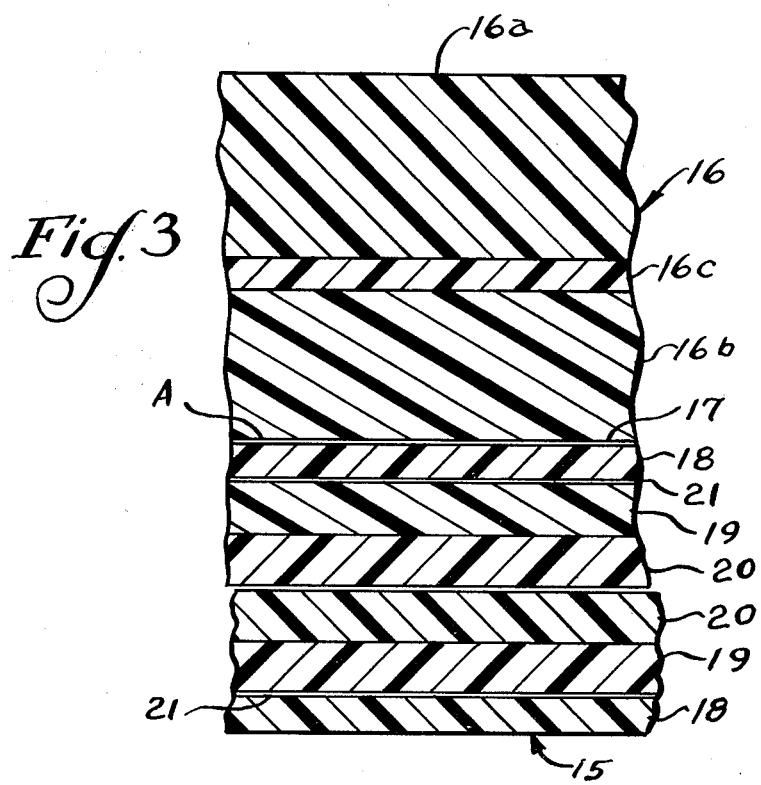
FIG. 3 is a fragmentary enlarged cross section of the pouch taken along the line 3—3 of FIG. 1.

Outer guard patch 16 is joined to the outer surface 17 of the laminate outer layer 18 by suitable means, such as adhesive A. Where the product 11 comprises a meat product having puncture-inducing bone projections, the guard may be referred to as a bone guard. As shown in FIG. 3, the illustrated bone guard patch 16 may have a thickness greater than the thickness of the laminate defining the enclosure 15. In the illustrated embodiment, bone guard patch 16 has a thickness of approximately twice that of the laminate. More specifically, in the illustrated embodiment, the thickness of patch 16 may be in the range of approximately 5 to 6 mils.

The bone guard patch 16 may be formed of synthetic resin such as polyethylene or polypropylene. Patch 16 is preferably formed of a plurality of cross-oriented layers. Illustratively, the sheets may be initially strech oriented and facially bonded together with the orientations thereof at a preselected angle, such as 90° to each other. Further illustratively, the bonding may be effected by providing an extrusion layer of resin 16c between the sheets as they are brought together. In one excellent pouch structure manufactured in accordance with the invention, the patch was formed of a pair of facially juxtaposed, cross-oriented sheets 16a and 16b of 2.7-mil thick high density polyethylene.

Enclosure 15 may be formed in a connected series such as in a laminated web suitably heat sealed at portions thereof to define a pouch having a heat sealed closed end 22, an open end 23, and heat sealed joined side edges 24 defined by transversely extending perforated tear lines 35. The individual pouches may be torn from the web along the respective tear lines 35 for use in individually packaging the meat products.

Figure 1:
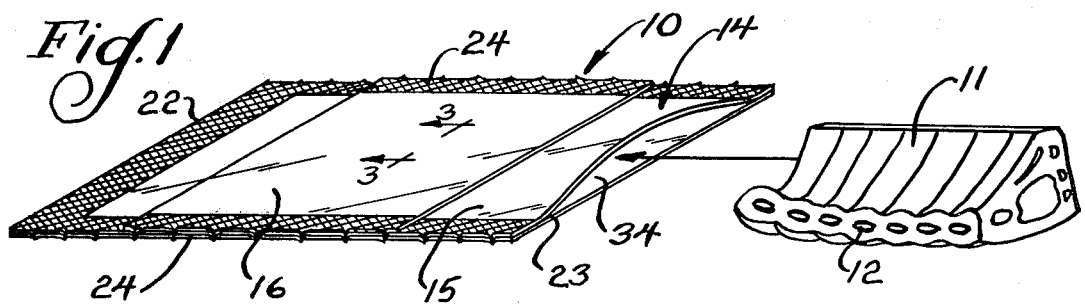
FIG. 1 is a perspective version of a flexible pouch embodying the invention.

The guard patch may be secured to the web of bags 15 as a continuous laminated web intermediate the pouch ends 22 and 23 and, thusly, crossing the side edges 24. The guard patch may extend fully to the closed end, 22, or be spaced therefrom as seen in FIG. 1. The guard may be provided with the tear lines also so that when a pouch is torn from the web, the pouch includes a bone guard extending fully from side edge to side edge but spaced from the open end 23 to permit facilitated subsequent heat sealing of the open end. The bone guard illustratively may be spaced from open end 23 at least approximately 2".

The guard may be secured to the outer surface of the enclosure by suitable synthetic rubber base pressure-sensitive adhesive.

While guard 16 extends less than the full area of the bag 15, the bag is preselected to overlie any projecting portions 12 of the meat product 11 intended to be packaged within the pouch. After the meat product is inserted through the open end 23 of the pouch, a vacuum may be applied to the interior of the pouch, drawing down the walls of the pouch tightly around the meat product and any projections thereof and causing facial engagement of any portions of the pouch extending laterally from the product. In one manufactured embodiment, patch 16 was spaced approximately 8" from open end 23 and at least approximately 1" from closed end 22.

It has been unexpectedly found that the provision of a bone guard patch on the outer surface 17 of a puncture-susceptible enclosure such as bag 15 causes the resultant pouch to be effectively puncture resistant. As bone guard patch 16 is affixed to the bag to form an integral portion of the pouch as used by the meat packer, there is no chance for movement of the bone guard away from the projections of the meat product as by slippage during the packaging operation. As discussed above, application of the bone guard patches 16 may be effected by mass production means. The cost of the pouch is maintained relatively low and substantial savings are effected in the use thereof by eliminating the heretofore expensive and time consuming individual protection operations while yet permitting facilitated vacuum drawing and heat sealing of the enclosure.

The invention provides further a substantial improvement over the background art pouches utilizing laminated sheets as the pouch material. Thus, by utilizing only the flexible bag as the closure portion of the pouch, facilitated heat sealing of the packaging may be effected while yet portions of the enclosure may define relatively thick protective portions which otherwise would present problems in the heat sealing of the enclosure.

While the patch may be somewhat thicker than the flexible bag portion of the pouch, the invention comprehends that the patch alternatively may have equal or less thickness such as to further permit facilitated packaging of the meat products.

The foregoing disclosure of specific embodiments is illustrative of the broad inventive concepts comprehended by the invention.

We claim:

1. A puncture-resistant pouch comprising: a flexible bag formed of synthetic resin material and defining an outer surface; and a puncture guard having an area less than that of the guard and being defined by grain-oriented, laminated synthetic resin sheets bonded to each other in cross-oriented relationship, an inner one of said sheets being bonded to said outer surface whereby the puncture guard defines an outermost portion of the pouch.

2. The puncture-resistant pouch of claim 1 wherein said puncture guard has a thickness in the range of approximately 5 to 6 mils.

3. The puncture-resistant pouch of claim 1 wherein said puncture guard is formed of stretch-oriented polyethylene sheets.

4. The puncture-resistant pouch of claim 1 wherein said puncture guard is secured to the bag outer surface by a pressure-sensitive adhesive.

5. The puncture-resistant pouch of claim 1 wherein the material forming said bag outer surface comprises nylon.

6. The puncture-resistant pouch of claim 1 wherein said bag includes an inner portion formed of polyethylene copolymer having approximately 3 to 6 percent vinyl acetate.

7. The puncture-resistant pouch of claim 1 wherein said bag includes an innermost portion formed of polyethylene copolymer having approximately 18 percent vinyl acetate.

8. The puncture-resistant pouch of claim 1 wherein said puncture guard comprises two layers of polyethylene sheet material each having a thickness in the range of approximately 2.5 to 3 mils.

9. The puncture-resistant pouch of claim 1 wherein said puncture guard is formed of high density polyethylene.

10. The puncture-resistant pouch of claim 1 wherein said bag outer surface is formed of coated nylon.

11. The puncture-resistant pouch of claim 1 wherein said puncture guard comprises two layers of grain-oriented polyethylene sheet material and an intermediate bonding layer of extruded polyethylene bonding said layers in said cross-oriented relationship.

12. A puncture-resistant pouch comprising: a flexible bag formed of heat-sealable synthetic resin material and defining an outer surface, a closed end, and an open end; and a puncture guard having an area less than that of the guard and being defined by grain-oriented, laminated synthetic resin sheets bonded to each other in cross-oriented relationship, an inner one of said sheets being bonded to said outer surface to define an outermost portion of the pouch, said puncture guard being spaced at least 1 inch from said open end to permit ease of heat sealing of said open end.

13. The puncture-resistant pouch of claim 12 wherein said bag further defines closed outer side edges and said puncture guard extends fully to said outer side edges.

* * * * *

UNITED STATES PATENT AND TRADEMARK OFFICE
CERTIFICATE OF CORRECTION

PATENT NO. : 4,239,111

DATED : December 16, 1980

INVENTOR(S) : ROGER P. CONANT and RAYMOND G. DUFFY

It is certified that error appears in the above-identified patent and that said Letters Patent is hereby corrected as shown below:

Claim 1, line 4 (col. 5, line 21) after "the" cancel "guard" and substitute therefor --bag--.

Claim 12, line 6 (col. 6, line 28) before "and" cancel "guard" and substitute therefor --bag--.

Signed and Sealed this

Twenty-ninth Day of May 1984

[SEAL]

Attest:

Attesting Officer

GERALD J. MOSSINGHOFF

Commissioner of Patents and Trademarks